Inventors
L. GOODALL
P. HEATON
N. WEST
By Cameron, Kerkam & Sutton
Attorneys

Inventors
L. GOODALL
P. HEATON
N. WEST
By Cameron, Kerkam & Sutton
Attorneys

April 21, 1970 L. GOODALL ET AL 3,508,007

CONFERENCE SWITCH FOR A MULTIPLE CHANNEL DIGITAL TELEPHONE SYSTEM

Filed Aug. 25, 1966 4 Sheets-Sheet 3

LEGEND (a) CODE DETECTION INPUT (b) LIMITING AMPLIFIER INPUT (c) LIMITING AMPLIFIER OUTPUT (d) SCHMITT TRIGGER OUTPUT

Inventors
L. GOODALL
P. HEATON
N. WEST
By
Cameron, Kerkam & Sutton
Attorneys

Inventors
L. GOODALL
P. HEATON
N. WEST
By Cameron, Kerkam & Sutton
Attorneys

United States Patent Office 3,508,007
Patented Apr. 21, 1970

3,508,007

CONFERENCE SWITCH FOR A MULTIPLE CHANNEL DIGITAL TELEPHONE SYSTEM

Laurence Goodall, Egham, Surrey, Peter Heaton, Highcliffe-on-Sea, and Norman West, Christchurch, England; said Goodall assignor to Ferranti Limited, Hollinwood, Lancashire, England, a company of Great Britain and Northern Ireland

Filed Aug. 25, 1966, Ser. No. 575,069
Claims priority, application Great Britain, Aug. 26, 1965, 36,649/65
Int. Cl. H04j *3/00;* H04m *3/56*
U.S. Cl. 179—15 8 Claims

ABSTRACT OF THE DISCLOSURE

A conference switch for a multiple-channel digital telephone systems is arranged so that only one subscriber may speak at once. The system operates in a time-division multiplex mode, and has a single detector common to all channels which actuates gating means to set up the seized channel and prevent seizure of any other channels. One or more of the subscribers may have preempt facilities.

This invention relates to digital telephone systems in which speech is coded so as to be transmitted and received in some suitable digital form.

In some systems, it is desirable to interconnect a number of subscribers so that they can confer with one another. In an ordinary analogue telephone system, this may be accomplished by the connection of all the subscribers to a common bus-bar. However, this method of combining the subscribers' signals is not practicable when using digitally-represented speech without first converting all of the digital signals to analogue form and then recoding the result into digital form. The apparatus needed to do this would be complex and costly. Also the process of decoding and recording would result in increased noise and the degradation of the resulting speech signal.

It is an object of the present invention to provide a conference switch for a digital telephone system which will facilitate the interconnection of conferring subscribers without the necessity of completely decoding the digital signal representing speech into analogue form and then recording the resultant analogue signals into digital form.

According to the present invention, a conference switch for a multiple-channel digital telephone system includes means for carrying digital signals derived from a number of sources, a detector operable to provide a distinctive output when, and only when, digital signals received from a source represent speech signals having an amplitude greater than a predetermined value, a plurality of gating means associated one with each source and responsive to said distinctive output to inhibit the transmission of distinctive outputs resulting from digital signals derived from other sources, and release means responsive to said distinctive output to reset said gating means when said distinctive output ceases for a time interval in excess of a predetermined duration.

Figure 1A:
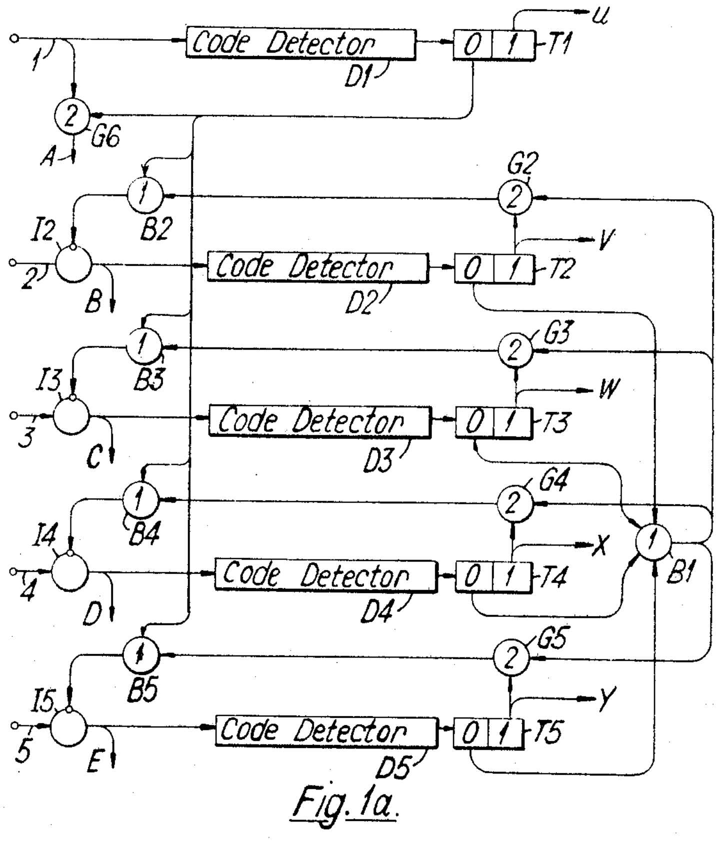
Figure 1B:
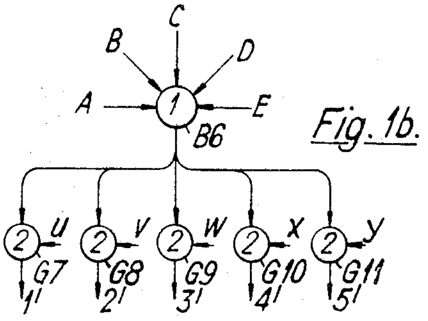
Figure 2:
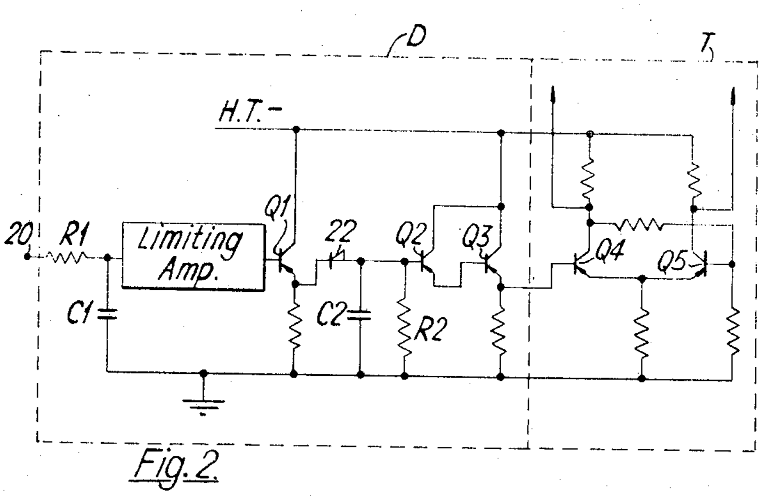
Figure 4:
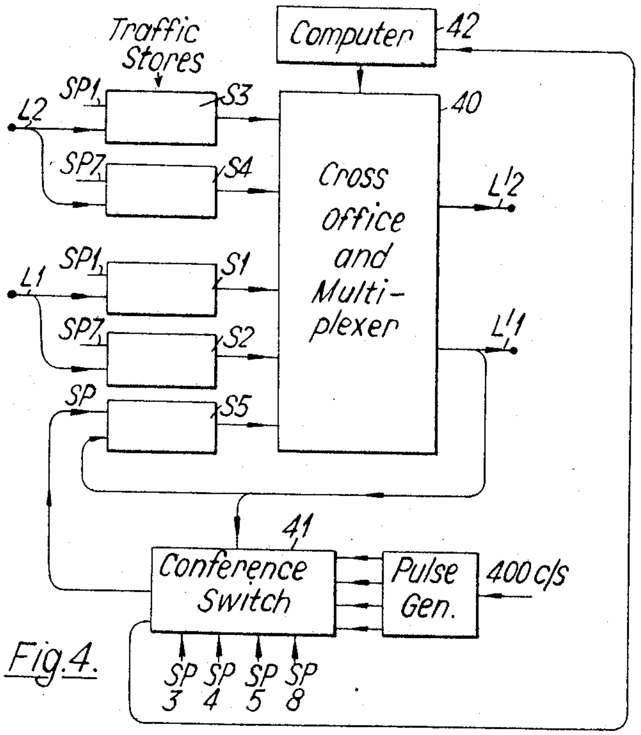
Figure 3:
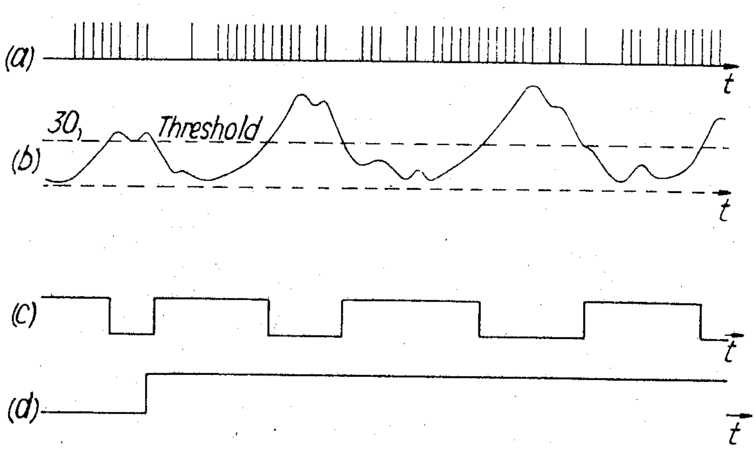

Embodiments of the invention will now be described, by way of example, with reference to the accompanying drawings, in which:

FIGURES 1(*a*) and 1(*b*) are logical circuit diagrams of one form of digital conference switch, FIGURE 2 is a diagram of a form of detector suitable for use in the conference switch shown in FIGURE 1, FIGURE 3 is a number of graphical waveforms illustrating the action of the circuit shown in FIGURE 2, FIGURE 4 is a block diagram of a time-division multiplex system using a digital conference switch, and FIGURES 5(*a*)–5(*d*) are logical circuit diagrams of a form of digital conference switch suitable for use in the system shown in FIGURE 4.

FIGURE 1(*a*) shows five input lines 1 to 5. The input line 1 feeds directly into a code detector D1, the output of which is applied to the 0-state input of a monostable trigger circuit T1. The input lines 2 to 5 are applied to inputs of inhibit gates I2 to I5 respectively. The outputs of the inhibit gates I2 to I5 are connected to inputs of code detectors D2 to D5 respectively. The outputs of the code detectors D2 to D5 are applied to the 0-state inputs of monostable trigger circuits T2 to T5 respectively. The 1-state outputs of the trigger circuits T2 to T5 are applied to inputs of AND-gates G2 to G5 respectively and to output lines V, W, X and Y respectively. The 0-state outputs of the triggers T2 to T5 are combined in a buffer B1 and the output of the buffer B1 is applied to second inputs of the AND-gates G2 to G5. The outputs of the AND-gates G2 to G5 are connected to inputs of buffers B2 to B5 respectively. The 0-state output of the trigger circuit T1 is applied to inputs of all of the buffers B2 to B5. The outputs of the buffers B2 to B5 are applied to the inhibiting inputs of the inhibiting gates I2 to I5 respectively. The input 1 and the 0-state output of the trigger circuit T1 are applied to the respective inputs of an AND-gate G6. The AND-gate G6 and the inhibit gates I2 to I5 have outputs A, B, C, D and E respectively. The 1-state of the trigger circuit T1 has an output line U. The code detectors D1 to D5 comprise the detector means of the conference switch, whilst the remaining elements shown in FIGURE 1(*a*) make up the gating means. The release function is performed by the trigger circuits T1 to T5 as will be described below.

In this embodiment the conference switch also performs the function of routing the incoming signals from one subscriber to the other subscribers. This is shown in FIGURE 1(*b*). FIGURE 1(*b*) shows the interconnections of the outputs A to E and the outputs U to Y shown in FIGURE 1(*a*). The outputs A to E are shown in FIGURE 1(*b*) applied to, and combined in, a buffer B6. The output of the buffer B6 is applied to inputs of AND-gates G7, G8, G9, G10 and G11. The output lines U to Y are connected to second inputs of the AND-gates G7 to G11 respectively. The AND-gates G7 to G11 yield outputs on outgoing lines 1′ to 5′ respectively. The outgoing lines 1′ to 5′ are arranged to be connected to the same subscribers as the incoming lines 1 to 5 respectively.

The signals applied to the inputs 1 to 5 are digital streams representing quanta of speech amplitude in a digital code. Each of the code detectors D1 to D5 is a simplified decoder which provides an output to operate its associated trigger circuit when the digital stream implies a sustained speech amplitude above a predetermined threshold level. It is desirable that each code detector should have an operating time constant such that its output does not operate its associated trigger circuit due to impulsive noise, but will operate the trigger circuit due to sustained vowel sounds. It is also desirable that it has a time constant acting at the end of a speech train represented by the incoming digital signals, so that its output does not cease to operate its associated trigger circuit during short pauses in speech.

When the incoming digital streams are in the form of delta-modulation, then the code detectors D1 to D5 may be simple integrator circuits having suitable time constants as will be described later with reference to FIGURE 2. Alternatively when the incoming digital signals are in the form of pulse code modulation, the code detectors may be such as to detect the presence of digits 1 in one or more of the more significant digit positions in each code group. The time constants may then be introduced digitally, as described hereinafter with reference to FIGURE 5.

The operation of the conference switch shown in FIGURE 1 will now be described. The input lines 1 to 5 are connected (by means not shown) to incoming lines capable of bearing digitally represented speech from five subscribers who are party to the conference. The subscriber connected to input line 1 will be considered to be the chairman of the conference. It will be assumed that all of the trigger circuits T1 to T5 are initially in the 1-state. There will be no output from the 0-states of the trigger circuits T1 to T5 so that the gates G2 to G6 will be closed and the gates I2 to I5 will be open. Because there is an output from the 1-states of the trigger circuits T1 to T5 the gates G7 to G11 will all be open by signals on the lines U to Y.

Let it now be assumed that the chairman speaks. In that case, the output from the code detector D1 will put the trigger circuit T1 into the 0-state. The resultant output from the 0-state of the trigger circuit T1 will open the gate G6 and close the gates I2 to I5. Therefore, the only digital signals reaching the buffer B6 will be those on the line A. There will be no output on the line U from the trigger circuit T1 so that the gates G7 will be closed. Thus, there will be no outgoing digital signal in the line 1′ back to the chairman. The gates G8 to G11 will, however, remain open to connect the chairman to the subscribers on the outgoing lines 2′ to 5′.

Now let it be assumed that the chairman on line 1 is not speaking and that one of the other subscribers, say the one on line 2, speaks first. In that case, the code detector D2 will put the trigger circuit T2 into the 0-state. This applies a 1 signal to the buffer B1 so that all of the gates G2 to G5 are opened. Since the trigger circuits T1 and T2 are in the 1-state and 0-state respectively, there will be no output from their 0-state and 1-state respectively so that the gate I2 will remain opened. Thus, the code detector D2 will continue to be supplied with the incoming digital stream and this digital stream will appear on the output line B to the buffer B6. The gate G8 will be closed because there will be no output on the line V, so that there will be no output to the subscriber on line 2′. Since the trigger circuit T2 is in the 0-state a signal is applied to the buffer B1. The output of the buffer B1 is applied via gates G3 to G5 and buffers B3 to B5 to close the gates I3 to I5 respectively. This prevents the subscribers on lines 3 to 5 from breaking into the conversation. The gates G7 and G9 to G11 are open because of outputs on the lines U, W, X, and Y respectively so that the subscribers on the lines 1′, 3′, 4′ and 5′ receive the digital stream on the incoming line 2. Since trigger circuit T1 is in the 1-state, the gate G6 is closed, thus cutting off noise from the chairman's incoming line 1.

If the chairman wishes to break in, he does this simply by speaking. The code detector D1 associated with the chairman's line gives an output signal which sets the triggers circuits T1 into the 0-state. This causes a signal to be applied to the inhibit gates I2 to I5 via the buffers B2 to B5 respectively. The operation of the inhibit gates cuts off any other subscriber who was speaking when the chairman broke in. The output U from trigger circuit T1 will disappear and trigger circuit T2 will reset to the 1-state, thus allowing the digital signals from line 1 to be fed via gate G6 and buffer B6 to the other subscriber's lines 2′ to 5′.

When a subscriber stops speaking, the switch is reset to a condition that will allow another subscriber to speak. The switch is reset by the action of the occupied trigger circuit. For example, when the chairman stops speaking for longer than a predetermined time interval, the trigger circuit T1 will revert to the 1-state. This will remove the inhibiting input from the inhibit gates I2 to I5, and allow another subscriber to use the conference switch. Due to the time constant associated with the code detector D2, no subscriber other than the chairman will be able to capture the conference switch until there is a relatively long pause in the conversion of the subscriber connected to incoming line 2. A similar sequence of events will take place if the subscriber on any one of the incoming lines 3 to 5 should speak first.

FIGURE 2 is a circuit diagram of a code detector and trigger circuit suitable for use in the circuit shown in FIGURE 1 when the incoming digital signal train is in the form of delta modulation. FIGURE 2 shows a detector D having an input 20 to an integrator circuit R1, C1 which has a cut-off frequency of approximately 500 cycles/second. The integrator circuit R1, C1 feeds a limiting amplifier 21 which is, in effect, a threshold circuit. The output of the limiting amplifier 21 is applied to a capacitor C2 via an emitter follower transistor Q1 and a diode 22. The capacitor C2 is shunted by a resistor R2. The voltage on the capacitor C2 is applied through a super-alpha pair emitter follower Q2, Q3 to a trigger circuit T in the form of a Schmitt trigger Q4, Q5.

The operation of the circuit shown in FIGURE 2 will now be described, reference being made where necessary to FIGURE 3. FIGURE 3(*a*) shows a typical delta modulation waveform occurring with time during speech. For the purpose of the other waveforms shown in FIGURES 3(*b*) to 3(*d*) it is assumed that the speech starts with the beginning of the waveform shown in FIGURE 3(*a*). This waveform is applied via the input terminal 20 to the integrator R1, C1. FIGURE 3(*b*) shows the variation with time of the amplitude of the output of the integrator R1, C1. The dotted line 30 indicates the threshold level of the limiting amplifier 21. FIGURE 3(*c*) shows the variation with time of the output of the limiting amplifier 21, from which it will be seen that the output of the amplifier 21 is relatively negative when the output of the integrator is above the threshold level and relatively positive when the output of the integrator is below the threshold level.

The changing time constant of the capacitor C2 is arranged to be approximately 10 milliseconds and is the product of the capacity of the capacitor C2 and the forward resistance of the diode 22 plus the output impedance of the emitter follower Q1. Therefore, after the limiting amplifier 21 has given a relatively negative output for 10 milliseconds, the state of the Schmitt trigger Q4, Q5 is changed from one state to the other state as indicated in FIGURE 3(*d*). This state is then held until the incoming delta modulation indicates that speed has lapsed for approximately 0.5 second. This period of time is the discharging time constant of the capacitor C2. This time constant is the product of the capacity of the capacitor C2 and the parallel combination of the resistance of the resistor R2 and the input impedance of the emitter follower Q2, Q3. The output of the Schmitt trigger Q4, Q5 is the output of one of trigger circuits controlling gates as shown in FIGURE 1.

The charging time constant of the capacitor C2 is sufficiently long to ensure that the trigger Q4, Q5 does not change state on the receipt of impulsive noise. The discharging time constant is chosen to be sufficiently long to prevent the trigger Q4, Q5 from changing its state back again during slight pauses, for example for taking breath, by the speaker.

FIGURE 4 is a block schematic diagram of part of a time-division multiplex system to which the invention is applied. The multiplex system illustrated is a simple one employing two trunk links each of which carries eight separate message channels in time-division multiplex in eight separate time slots. Only two channels in each trunk link are used in FIGURE 4. Each channel carries digital signals in successive groups of six pulse code modulation (P.C.M.) digits, each group representing an amplitude quantum of a speech signal. FIGURE 4 shows a trunk link L1 connected to two traffic stores S1 and S2 to which the traffic on the trunk link L1 in channels 1 and 7 is distributed in multiplex time slots SP1 and SP7 respectively. FIGURE 4 also shows a trunk link L2 connected to traffic store S3 and S4 to which the traffic on the trunk link L2 in channels 1 and 7 is distributed in time slots SP1 and SP7 respectively. The digital signals stored in the traffic stores S1, S2, S3 and S4 are redistributed by a cross-office and multiplexer 40 so that they re-appear on trunk link L'1 in channels 3, 4, 5 and 8 respectively. These channels on trunk link L'1 are reserved for providing a conference facility. The channels 3, 4, 5 and 8 on trunk link L'1 are applied to a conference switch 41 and also to a further traffic store S5. The time slot SP in which the output of trunk link L'1 is distributed to the traffic store S5 is determined by the conference switch 41 as will be described hereinafter. The cross-office and multiplexer 40 is controlled by a computer 42. Under the control of the computer 42. Under the control of the computer 42, the cross-office and multiplexer 40 extracts the content of the traffic store S5 in time slot 8 and distributes it to any three of the four following channels, namely channels 1 and 7 on trunk link L'1 and channels 1 and 7 on trunk link L'2. Time slot 8 is used since their is no other input to the multiplexer at this time. An output from the conference switch 41 to the computer 42 causes the computer 42 to control the cross-office and multiplexer 40 so that an output does not occur to that channel and trunk link whose speaker captures the conference switch.

The conference switch 41 receives a number of pulses including time slot signals SP3, SP4, SP5 and SP8 and also pulses from a pulse generator 43 which is itself fed with a 400 cycles/second signal.

Time slot 8 is used to extract the contents of the traffic store S5 since this capacity of the equipment is not otherwise used in the embodiment shown in FIGURE 4. However, in the case where the cross-office and multiplexer 40 has sixteen inputs and all are in use then some alternative arrangements must be made to route the contents of the traffic store S5 to the other conference subscribers. In practice, therefore, the output of the traffic store S5 will be connected to a second multiplexer during any desired time slot, and the second multiplexer will be controlled by the computer 42 to route the contents of the traffic store to the appropriate subscribers.

It will be noted that, in the embodiment of FIGURE 4, the conference switch 41 does not perform any routing function. This is carried out by the cross-office and multiplexer 40 under the control of the computer 42.

Figures 5A, 5B, 5C, 5D:
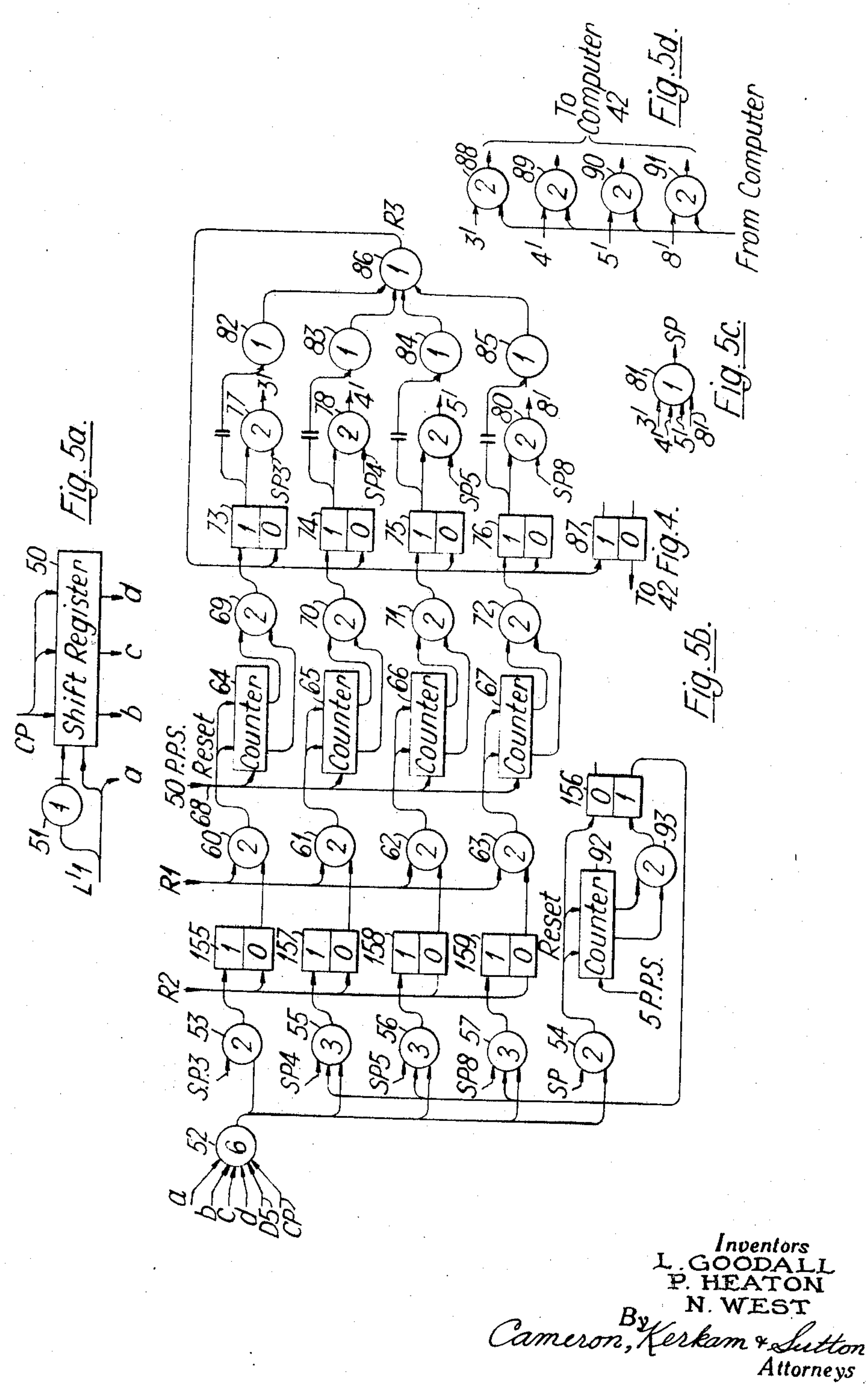

FIGURE 5 is a logical circuit diagram of the conference switch 41 shown in FIGURE 4. For clarity of representation FIGURE 5 has been split up into four separate diagrams (*a*), (*b*), (*c*) and (*d*). FIGURE 5(*a*) shows a three-stage shift register 50 to which the trunk link L'1 is connected through an inverter 51. Digits signals on the trunk link L'1 are thus fed to the register 50 which is shifted in time with the digit signals by clock pulses CP derived from the computer 42 (FIGURE 4). The effective input *a* to the shift register 50 and the outputs *b*, *c* and *d* of the stages of the shift register are all applied to a six-input AND-gate 52 (FIGURE 5*b*). Clock pulses CP and digit pulses D5, which occur towards the end of each time slot, are also applied to the gate 52. By this means, the first four digits of an incoming 6-bit P.C.M. signal may be examined and if they are all 1's, the gate 52 will provide an output. This ensures that the subsequent circuits are operated by signals representing a high-amplitude voice sound (such as a vowel sound) but not by lower-amplitude noise levels.

The output of the gate 52 is applied to two two-input AND gates 53 and 54 and to three three-input AND gates 55, 56, and 57. The gate 53, and initially the gates 55, 56 and 57, are opened by time slot signals SP3, SP4, SP5 and SP8 respectively. The outputs of the gates 53 to 57 are connected to the inputs of trigger circuits 155 to 159 respectively. The trigger circuits 155 and 157 to 159 are reset by input pulses on a line R2 once every 5 milliseconds. The outputs of the trigger circuits 155 and 157 to 159 are applied to inputs of two-input AND-gates 60 and 61 to 63 respectively. Also applied to the gates 60 to 63 are pulses on a line R1, which pulses occur once every 5 milliseconds just before the pulses on the line R2.

The outputs from the gates 60 to 63 are applied to resetting inputs of four two-stage binary counters 64 to 67 respectively. The counting inputs of the counters 64 to 67 are all connected to a line 68 which carries a train of pulses having a recurrence frequency of 50 pulses/second. The outputs from the two stages of the counters 64 to 67 are applied to the two inputs of two-input AND gates 69 to 72. The outputs of the gates 69 to 72 are applied to the inputs of trigger circuits 73 to 76 respectively. Outputs from the 1-states of the trigger circuits 73 to 76 are applied together with time slot pulses SP3, SP4, SP5 and SP8 to two-input AND-gates 77 to 80 respectively. The outputs 3', 4', 5' and 8' respectively of the gates 77 to 80 are applied to, and combined in, a buffer 81 to yield an output SP as shown in FIGURE 5(*c*). The output from the buffer 81 is applied to the gate 54 (FIGURE 5(*b*)) and to the traffic store S5 (FIGURE 4).

Outputs of the trigger circuits 73 and 76 are also applied to buffers 82 to 85, the outputs of which are applied to, and combined in, a buffer 86. The output R3 of the buffer 86 is applied to resetting inputs of the trigger circuits 73 to 76. The output R3 is also applied to a trigger circuit 87 an output of which is applied to the computer 42 (FIGURE 4). An output of the computer is applied to four AND-gates 88 to 91 (FIGURE 5(*d*)) to which the outputs 3', 4', 5' and 8' respectively from the gates 77 to 80 are also applied. The outputs of the gates 88 to 91 are applied to an input of the computer 42.

The gate 54 has an output which is applied to the resetting inputs of a two-stage binary counter 92 and to a resetting input of the trigger circuit 156. The outputs of the stages of the counter 92 are applied to a two-input AND-gate 93, the output of which is connected to the input of the trigger circuit 156. The output of the trigger circuit 156 is applied to inputs of the gates 55 to 57. It should be noted that the trigger circuits 73 to 76 and 155 to 159 are bistable circuits, and not monostable circuits as in the embodiment of FIGURE 1.

In this embodiment the detector means is made up of the shift register 50 and the 6-input AND gate 52, and it operates in a manner to be described below. The remainder of the components of FIGURE 5(*b*) constitute the gating means, with the exception of counter 92, gate 93 and trigger circuit 156. These latter elements form the release means.

The method of operation of the circuit shown in FIGURE 5 will now be described. As hereinbefore mentioned, the gate 52 will give an output only if a signal from the trunk line L'1 indicates a speech amplitude level greater than a predetermined value. In this case, the speech amplitude has to be at least ⅞ of the maximum possible. Let it be assumed that the required amplitude occurs during time slot SP4 due to the subscriber on trunk link L1, channel 7 (FIGURE 4). This time slot is repeated once every 150 microseconds, this being the frame period of the time-division multiplex system. The pulse on the line L1 occurs before the pulse on the line L2 and they both occur only once every 5 milliseconds. The vowel sounds capable of giving the required amplitude have, after band-limiting, a frequency spectrum in the region of 300 to 1000 cycles/second. It follows that while a vowel sound continues, it will be highly likely that the trigger circuit 157 will be set to its 1-state via gate 55 and gate 61 will be closed before each occurrence of the pulse on the line L1. Also, since the shortest duration vowel sound has a duration of approximately 50 milliseconds, the counter 65 will have ample time in which to count to the binary number 11. When this occurs the gate 70 is opened to put the trigger circuit 74 into its 1-state. This opens the gate 78 which gives an output on the line 4', thus providing a pulse SP in the time slot 4 at the output of the gate 81. This pulse SP lets the signals of the subscriber on trunk link L1, channel 7, into the traffic store S5 (FIGURE 4) so that all three other subscribers will receive his signals after multiplexing into their respective time slots by the cross-office and multiplexer 40 (FIGURE 4). It should be noted that short-lived impulsive noise will not normally yield a sustained output from the gate 52 and, therefore, the pulses on the line L2 will reset the trigger circuit 157 to its 0-state and allow pulses on the line L1 to reset the counter 65 before the counter has counted to 11.

The 1-output from the trigger circuit 74 also causes the output R3 to maintain the other triggers circuits 73, 75 and 76 in the 0-state. The output R3 also puts the trigger 87 into its 1-state. This causes the computer 40 (FIGURE 4) to apply a signal to the gates 88 and 91 (FIGURE 5(*d*)) and an output from the gate 89 is sent back to the computer. This causes the cross-office and multiplexer 40 (FIGURE 4) to disconnect the return from the cross-office and multiplexer to the subscriber, allocated to time slot 4, who has captured the circuit. This keeps that subscriber's side-tone to a reasonable level.

The time slot pulse SP from the gate 81 (FIGURE 5(*c*)) opens the gate 54 (FIGURE 5(*b*)) during time slot 4 so that as long as there is an output during that time slot from the gate 52, a pulse at the output of the gate 54 will reset the counter 92 and also reset the trigger circuit 156. In that case, there is no output from the 1-state of the trigger circuit 156 and the gates 55 to 57 are closed. This means that once the conference switch has been captured by a subscriber, it cannot be captured by another subscriber, other than the subscriber allocated to time slot SP3, while the trigger circuit 156 is in its 0-state. However, if the subscriber who has captured the conference switch does not speak for 600 milliseconds there will be an absence of reset pulses from the gate 54 for a sufficient time to allow the binary counter 92 to count up to 11. When this occurs, the gate 93 is operated to set the trigger circuit 156 into the 1-state so that the gates 55 to 57 are once more capable of being opened during their respective time slots by outputs from the gate 52.

The same sequence of events occurs when any other subscriber connected to the conference switch in the time slots allocated thereto speaks first and captures the switch. However, It should be noted that the subscriber allocated to time slot SP3 in the conference switch has the power to capture the conference switch at any time merely by speaking. This allows the above sequence of events to occur in time slot 3, thus operating the gates and trigger circuits associated with this channel. This is possible because gate 53 is not inhibited by the absence of the output from the 1-state of trigger circuit 156. However, the operation of trigger circuit 73 during time slot 3 causes buffer 86 to produce an R3 pulse which resets the appropriate one of the trigger circuits 74 to 76 associated with the subscriber who was speaking previously. Trigger circuit 156 is also set to, or maintained in the 0-state so that gates 55 to 57 are closed. This prevents any other subscriber speaking.

Whichever one of the triggers circuits 73 to 76 is set to the 1-state by a speaking subscriber remains set even when the release counter 92 frees the conference switch for another subscriber. These trigger circuits may only be reset by an R3 pulse from buffer 86, resulting from another subscriber capturing the conference switch.

The action of the shift register 50 and the gate 52 is to guard against comparatively low-level noise and in this respect is similar to the action of the limiting amplifier 21 of FIGURE 2.

The action of any of the counters 64 to 67 is to provide a time lag before the conference switch is captured by any subscriber so as to guard against capture of the switch by short-duration impulsive noise. In this way, it is similar to the charging time constant of the capacitor C2 of FIGURE 2. The action of the counter 92 is to prevent any subscriber except that allocated to time slot SP3 from capturing the switch until the subscriber who has already captured the switch has finished speaking and not merely paused for breath. In this way, the counter 92 has substantially the same type of function as the discharging time constant of the capacitor C2 of FIGURE 2.

It will be realised by those versed in the art that the embodiment shown in FIGURE 5 is capable of many modifications. For example, the shift register 50 and the gate 52 may be replaced by other arrangements designed to yield an output when the input signal indicates an amplitude above any suitable level. Furthermore, the input to the counters 64 to 67 may be at any frequency calculated to provide a desired time lag before the switch is captured. Similarly, the input to the counter 92 may be at any frequency calculated to provide a suitable time lag before the switch is released from its captured condition.

What we claim is:

1. In a multiple-channel telephone system carrying digital data, a conference switch which includes:

(a) means for carrying digital signals derived from a number of sources, the signals from each source being arranged to occupy a separate time slot in a time-division-multiplex cycle, (b) a detector common to all said sources and operable to provide a first distinctive output when, and only when, digital signals from one of said sources represent speech signals having an amplitude greater than a predetermined value, distinctive outputs of said detector being distinguished from one another by the time slots during which they occur, (c) a plurality of gating means associated one with each of said sources and responsive to said first distinctive output to inhibit the transmission of other distinctive outputs resulting from digital signals derived from any of the sources other than the source providing said distinctive output, and (d) release means responsive to said first distinctive output to reset such of said gating means as have responded to said first distinctive output when said first distinctive output ceases for a time interval in excess of a predetermined duration.

2. A conference switch as claimed in claim 1 in which said common detector is operable to provide a distinctive output only after the digital signals received from said one source represent speech signals having an amplitude greater than said predetermined value for a time in excess of a required duration.

3. A conference switch as claimed in claim 1 in which said common detector includes a shift register operable to inspect successive digits of the digital signal and a gate operable when, and only when, the inspected digits conform with a predetermined code.

4. A conference switch as claimed in claim 1 in which each gating means includes a bistable trigger circuit responsive to a distinctive output occurring during the time slot associated with said gating means to close inhibit gates controlling the application to the trigger circuits of distinctive outputs occurring during other time slots.

5. A conference switch as claimed in claim 4 in which said release means includes a binary counter operable to reset said inhibit gates in the absence of a distinctive output from said detector, 6. A conference switch as claimed in claim 1 in which the presence of a distinctive output during any one time slot prevents the provision of distinctive outputs on all other channels.

7. A conference switch as claimed in claim 1 in which the presence of a distinctive output during any one time slot prevents the provision of distinctive outputs during all except a predetermined one of said time slots.

8. A conference switch as claimed in claim 7 in which the provision of a distinctive output during said predetermined one of said time slots prevents the provision of distinctive outputs during all other time slots.

References Cited

UNITED STATES PATENTS

| | | | |
|---|---|---|---|
| 3,204,043 | 8/1965 | Arsenau et al. | 179—15 |
| 3,293,369 | 12/1966 | Schroeder | 179—15 |
| 3,369,080 | 2/1968 | Miller et al. | 179—18 |
| 3,387,095 | 6/1968 | Miller et al. | 179—18 |

KATHLEEN H. CLAFFY, Primary Examiner

A. B. KIMBALL, Jr., Assistant Examiner

U.S. Cl. X.R.

179—18